United States Patent
Twigg

(10) Patent No.: US 6,651,424 B1
(45) Date of Patent: Nov. 25, 2003

(54) CATALYST SYSTEMS

(75) Inventor: Martyn Vincent Twigg, Caxton (GB)

(73) Assignee: Johnson Matthey Public Limited, London (GB)

( * ) Notice: Subject to any disclaimer, the term of this patent is extended or adjusted under 35 U.S.C. 154(b) by 0 days.

(21) Appl. No.: 09/936,195

(22) PCT Filed: Feb. 2, 2000

(86) PCT No.: PCT/GB00/00296

§ 371 (c)(1), (2), (4) Date: Sep. 10, 2001

(87) PCT Pub. No.: WO00/53903

PCT Pub. Date: Sep. 14, 2000

(30) Foreign Application Priority Data

Mar. 11, 1999 (GB) .............................................. 9905550

(51) Int. Cl.⁷ ................................................ F01N 3/00
(52) U.S. Cl. .............................. 60/289; 60/274; 60/284; 60/286
(58) Field of Search ........................ 60/274, 284, 285, 60/286, 289, 303; 123/3

(56) References Cited

U.S. PATENT DOCUMENTS

| | | | |
|---|---|---|---|
| 3,170,758 A | | 2/1965 | Honerkamp |
| 3,908,365 A | * | 9/1975 | Schweibold et al. .......... 60/274 |
| 5,297,515 A | * | 3/1994 | Gale et al. ...................... 123/3 |
| 5,412,946 A | * | 5/1995 | Oshima et al. ............... 60/286 |
| 5,425,233 A | * | 6/1995 | Ma et al. ...................... 60/289 |
| 5,765,368 A | | 6/1998 | Matsumoto et al. |
| 5,867,982 A | * | 2/1999 | Tengblad et al. ............. 60/284 |
| 6,041,593 A | * | 3/2000 | Karlsson et al. ............. 60/284 |
| 6,138,454 A | * | 10/2000 | Fournier et al. ............. 60/286 |
| 6,244,044 B1 | * | 6/2001 | Bartley ........................ 60/284 |

FOREIGN PATENT DOCUMENTS

| | | |
|---|---|---|
| GB | 2 277 045 | 10/1994 |
| JP | 63-68714 | * 3/1988 |
| WO | WO 93/18346 | 9/1993 |
| WO | WO 96/39576 | 12/1996 |
| WO | WO 98/40611 | 9/1998 |

* cited by examiner

Primary Examiner—Thomas Denion
Assistant Examiner—Tu M. Nguyen
(74) Attorney, Agent, or Firm—RatnerPrestia

(57) ABSTRACT

A system and method for the after-treatment of exhaust gases from an internal combustion engine is provided. The system includes a first catalyst disposed downstream of the engine, through which the exhaust gases flow and which is effective to catalyze a shift reaction between carbon monoxide and water, or which is exhaust gas. The system also includes an oxygen source disposed between the first catalyst and a hydrocarbon trap, and downstream from all of those a three-way catalyst to catalytically oxidize hydrocarbons and carbon monoxide to reduce noxious emissions.

11 Claims, 4 Drawing Sheets

TEST 3  The presence of Hydrogen lowers the Light-off Temperature of a 3-Way Catalyst.

TEST 1  Production of Hydrogen from Simulated Exhaust Gas under Rich conditions.

TEST 2

Fig.4.
TEST 3  The presence of Hydrogen lowers the Light-off Temperature of a 3-Way Catalyst.
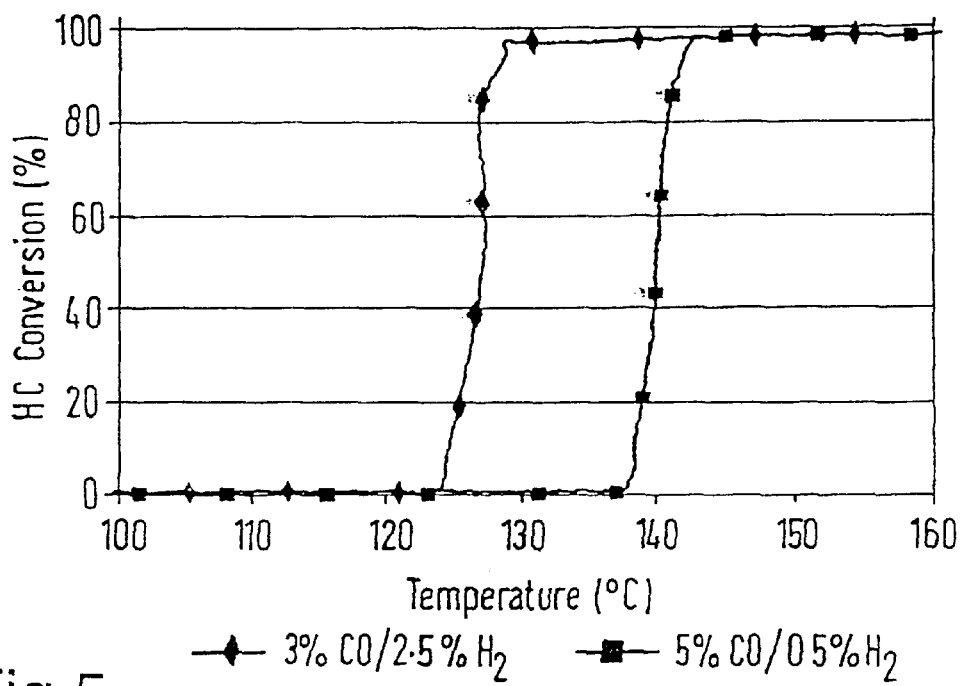
◆ 3% CO/2·5% H₂     ■ 5% CO/0·5% H₂
Fig.5. TEST 4  T.W.C. Catalyst Light-off Temperature Under Standard engine conditions.
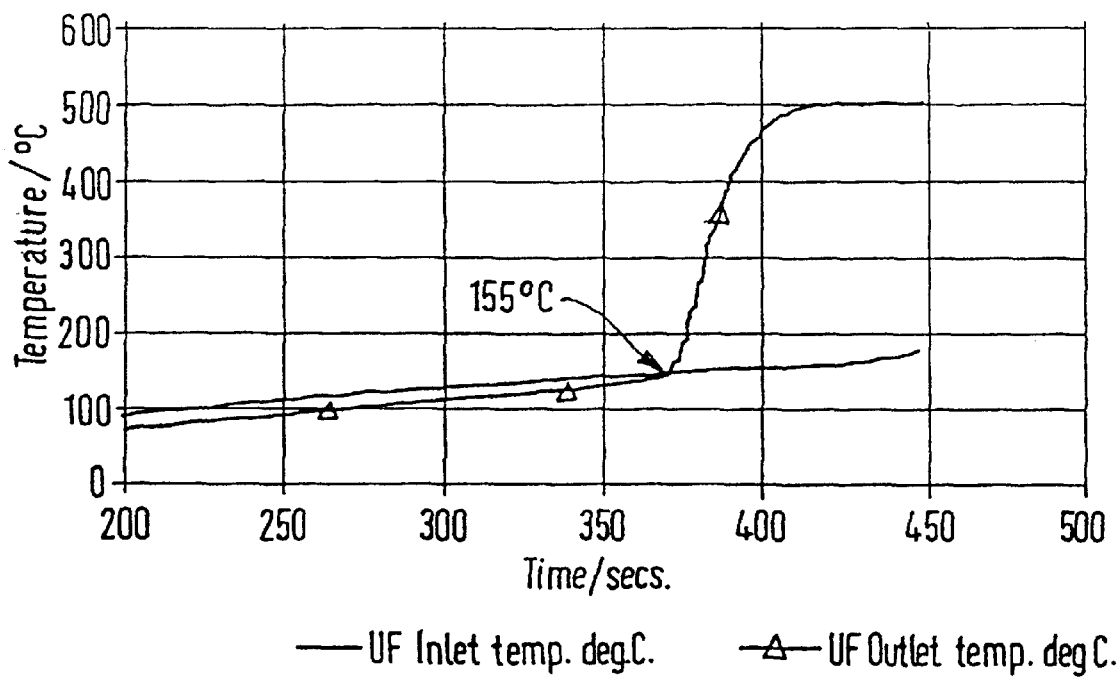
—— UF Inlet temp. deg.C.     —△— UF Outlet temp. deg C.

TEST 5 — Hydrogen Generation improves T.W.C. Light-off Temperature.

TEST 6 — Pre-TWC Trap enhances Light-off further.

CATALYST SYSTEMS

FIELD OF INVENTION

The present invention concerns improvements in catalyst systems for the control of exhaust gas emissions from vehicles.

BACKGROUND OF INVENTION

The emissions from vehicle exhausts are now well known to cause pollution, health problems and ecological damage. For this reason, various governmental or quasi-governmental bodies have issued regulations giving maximum levels of the main pollutants, namely carbon monoxide (CO), unburnt hydrocarbons (HC), NOx and, in the case of diesel engines, particulates. Increasing standards have been published, to come into effect at various times in the future, with the eventual aim for example in the USA to meet demanding regulations known as "ULEV" (Ultra Low Emission Vehicle), with a proportion of vehicles having zero regulated emissions "ZEV". A variety of strategies have been suggested, including a system described in WO 96/39576 (Johnson Matthey) which has been found in tests in cars to exceed the ULEV standards. This system principally uses a very low light-off catalyst, which starts conversion of CO and/or $H_2$ immediately upon start-up of the engine, thus creating an exotherm which rapidly raises catalyst temperature to the point of HC light-off. ("Light-off" is understood to be the temperature at which a given amount, for example 50% by weight, of a reactant is converted.)

There remains, however, the need for a system that is robust and able to cope with the wide variety of gasoline grades marketed, especially with regard to high sulphur levels and other possible catalyst poisons, especially traces of lead. The above-mentioned WO 96/39576 states that it is preferred to use CO as a "fuel" for initiating HC light-off. It is acknowledged that most engines do not produce significant quantities of hydrogen in the exhaust, and therefore a secondary source of hydrogen, such as an on-board reformer, would be necessary if hydrogen were to be required to play a major part in speeding HC light-off. A reformer itself requires an appreciable time to start-up to produce hydrogen. Another feature of the described development is that it does not require so-called "starter" catalysts mounted in the "close-coupled" position very close to, or even within, the exhaust gas manifold. WO 93/18346 (South West Research) discloses the use of a first combustion chamber in an internal combustion engine to produce an exhaust gas which is treated by a water gas shift reactor to produce a gas enriched in hydrogen, and thereafter recycling that hydrogen-enriched gas to another combustion chamber, to reduce the overall emissions of unburnt hydrocarbons and nitrogen oxides. All additional hydrogen produced is consumed within the engine.

GB 2,277,045 (Ford Motor Co.) concerns an adoption of the "EGI" (Exhaust Gas Ingnition) system which utilises an afterburner, and requires the temporary trapping of unburnt hydrocarbons so that only CO and hydrogen reach an afterburner where the gases are ignited by a spark plug. It is to be noted that this disclosure requires the use of an afterburner separate from a catalytic convertor downstream of the afterburner. This disclosure does not contemplate either increasing the hydrogen content of the exhaust gases or utilising hydrogen except in an EGI system.

BRIEF DESCRIPTION OF THE DRAWINGS

FIG. 4 shows SCAT test results where the hydrogen/carbon dioxide ratio was manipulated to illustrate different degrees of water gas shift catalyst performance;

FIG. 5 shows light-off temperature of a conventional three-way catalyst where no upstream starter catalyst is used;

DETAILED DESCRIPTION OF INVENTION

Figure 1:
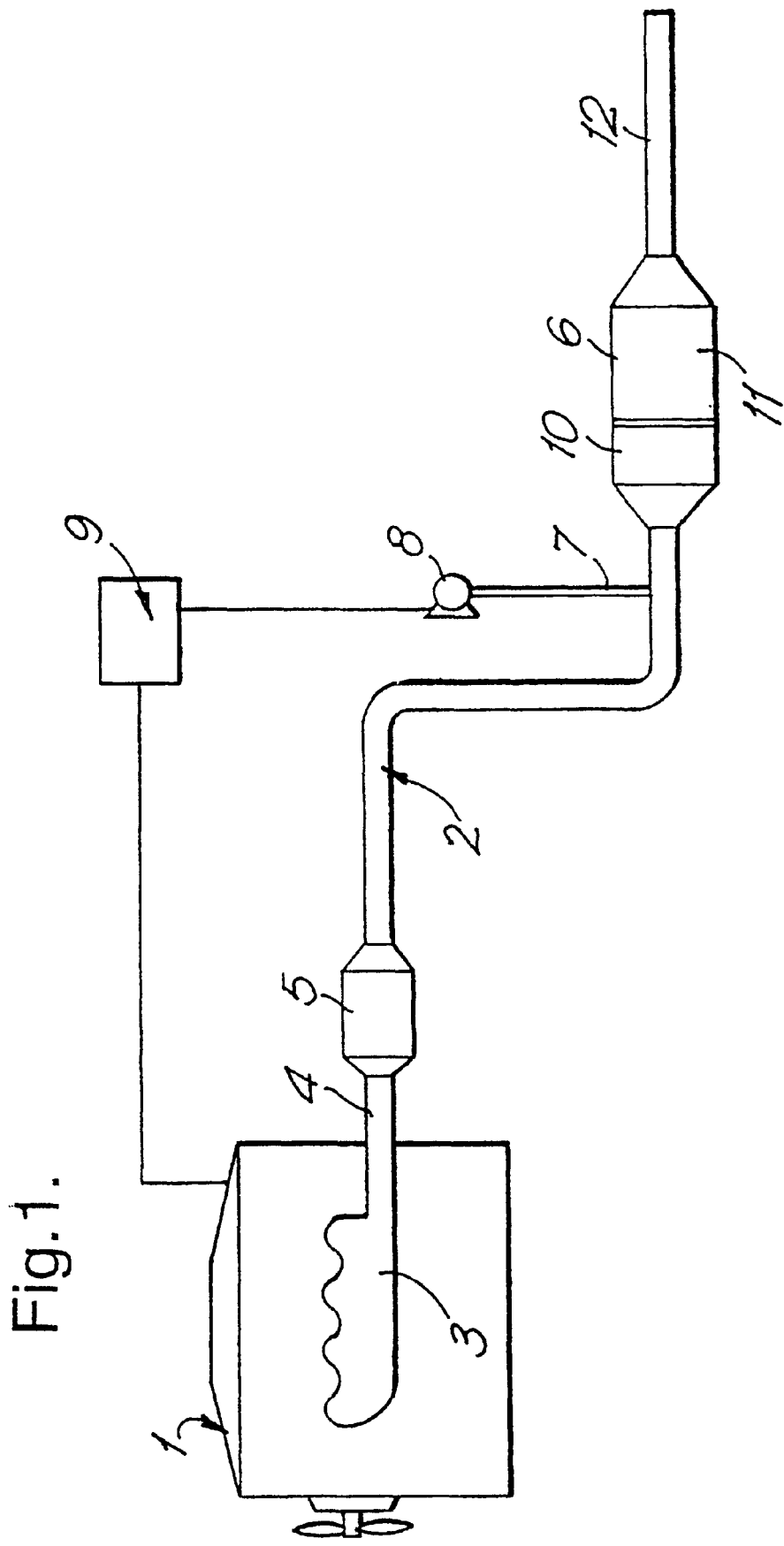
FIG. 1 is a schematic diagram of a motor vehicle incorporating a catalyst system according to the present invention.
Figure 2:
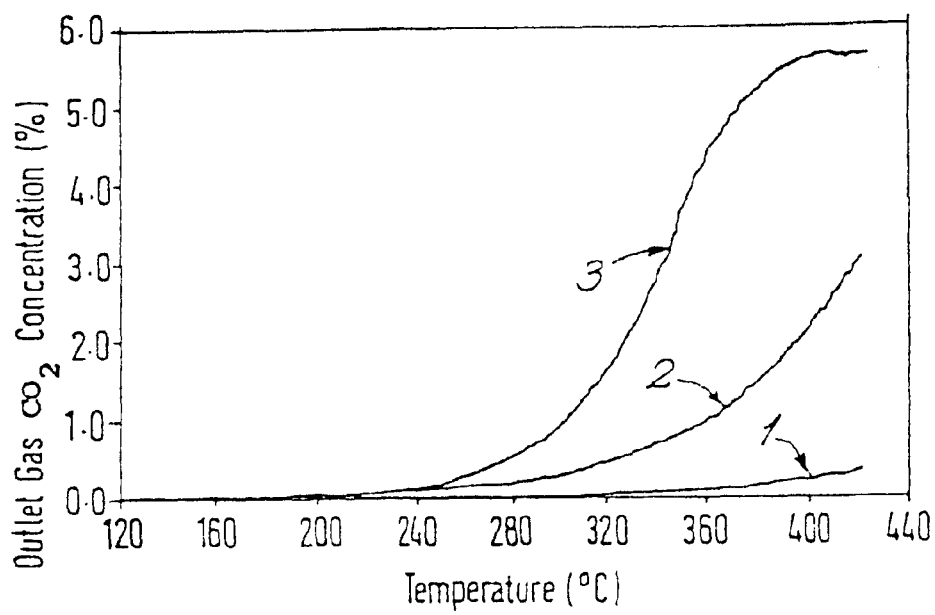
FIG. 2 shows SCAT rig data for the generation of hydrogen by three different catalyst samples.
Figure 3:
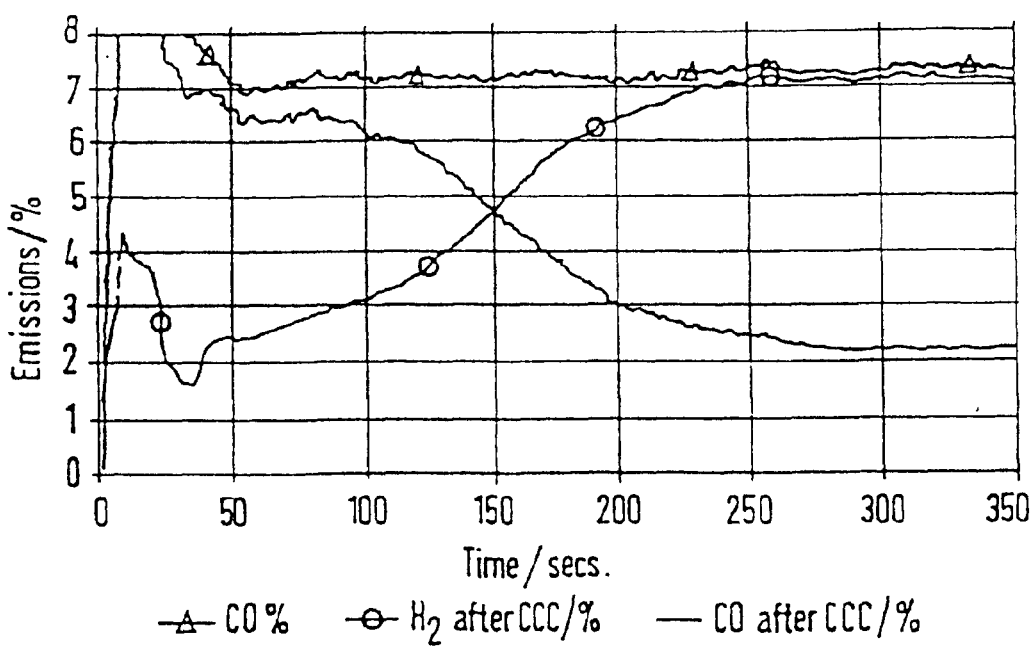
FIG. 3 shows test results for an engine operated in accordance with the invention and illustrates carbon monoxide decay and increased hydrogen concentrations.
Figure 6:
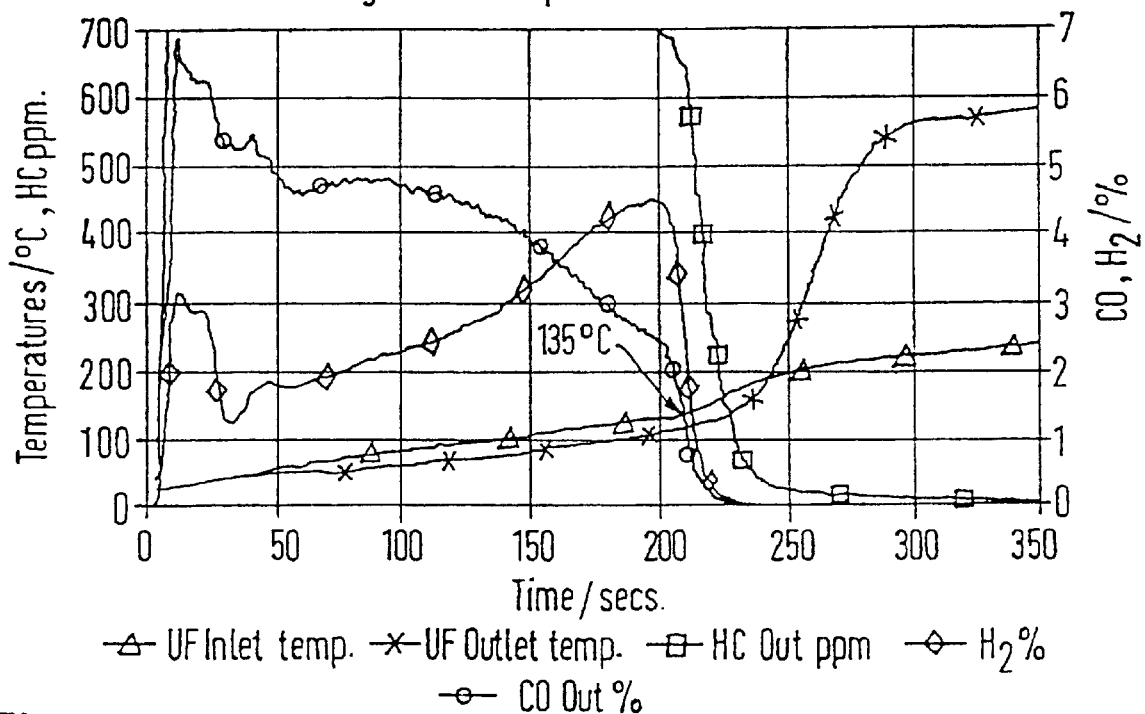
FIG. 6 shows temperature plots at the inlet and the outlet of the TWC.
Figure 7:
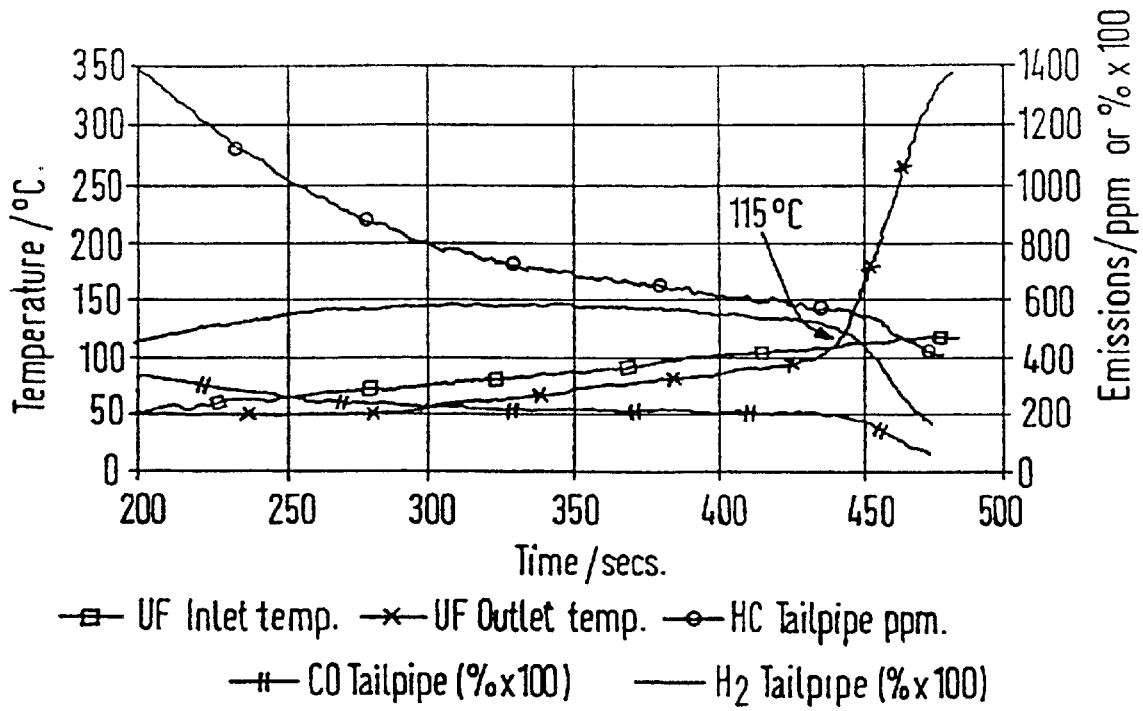
FIG. 7 shows results from a complete system in accordance with the present invention.

The present invention provides a system for the after treatment of the exhaust gases from a gasoline-fuelled internal combustion engine designed to operate under essentially stoichiometric conditions, comprising a first catalyst through which the exhaust gases flow and which is effective to catalyse a shift reaction between CO and $H_2O$ or is effective to catalyse the conversion of a reactant to generate a hydrogen-enriched exhaust gas, a source of gaseous oxygen, a trap for hydrocarbons and a three-way catalyst effective to catalytically oxidise HC and CO and to reduce $NO_x$.

The invention further provides a method of reducing pollutants from a gasoline-fuelled internal combustion engine designed to operate under essentially stoichiometric conditions, particularly during start-up, comprising starting the engine under rich conditions, enriching the resulting exhaust gases with hydrogen by a catalytic shift reaction, diluting the resulting exhaust gases with gaseous oxygen to produce lean conditions, trapping hydrocarbons in a hydrocarbon trap, and initiating oxidation of the hydrogen and CO over a three-way catalyst.

The present invention yields unexpected benefits, in that the presence of hydrogen is not only beneficial from the consideration of the exotherm from hydrogen oxidation causing more rapid heating of the three-way catalyst to reach light-off temperature for HC, but also results in the surprising reduction of HC light-off temperature. This aspect could not have been predicted before the present invention. Accordingly, although we do not wish to be restricted by any theory expressed herein, it is possible in preferred embodiments to trap HC upon start-up and delay the desorption of HC from the trap until the three-way catalyst has reached the reduced light-off temperature for HC oxidation. This latter intention has been expressed in the past, but has proved impossible to achieve. The invention desirably includes control means to initiate and terminate the addition of the appropriate quantity of gaseous oxygen upon start-up of the engine. Suitable air pumps are available to the skilled person. It will be appreciated that a richer start-up, for example at an air-fuel ratio ("$\lambda$") of 0.8, whilst common before emissions regulations, is generally thought to be undersirable because of the increased levels of HC at start-up, that is before any catalyst can begin to convert HC. State-of-the-art starting strategies tend to be "lean-start", but this does require careful control and is more difficult to achieve than a rich-start strategy.

The first catalyst is preferably optimised to generate hydrogen using the shift reaction, under rich conditions.

Desirably, the first catalyst is in the close-coupled position, located within or not more than about 20–30 cm from the exhaust gas manifold. This ensures that the catalyst immediately receives the benefit of the combustion heat from the engine, so that the generation of hydrogen is practically immediate, thus avoiding start-up delays from reformers. The first catalyst may be quite small, as is customary for "start-up" catalysts, and is desirably supported on a metal or ceramic honeycomb support of conventional type. The catalyst itself is desirably a platinum group metal catalyst, eg one or more of Pd, Rh and Pt, more desirably Pt or Rh. The catalyst support is desirably coated with a high surface area washcoat of, for example stabilised alumina and/or a ceria-zirconia mixed oxide or a ceria, preferably the latter. The catalyst may be manufactured according to methods generally known in the art. If desired, the catalyst may be promoted. Desirable loadings of precious metal are 1.77 to 14.12 g/liter (50 to 400 g/cuft), preferably 3.53 to 10.59 g/liter (100 to 300 g/cuft) of catalyst volume. It is preferred that the catalyst is selective to the production of $H_2$ and $CO_2$ rather than $CH_4$.

As an alternative to the above-desired shift reaction catalyst, a reagent may be added to the exhaust gases prior to the first catalyst, which reagent generates hydrogen under the typical start-up conditions. For example, the injection of methanol can generate appreciable volumes of hydrogen, and 7 to 8 ml of methanol is considered sufficient to yield the benefits of the present invention. Other reagents may be used.

The exhaust gases leaving the first catalyst are enriched with hydrogen. In order to ensure that the highly exothermic oxidation of hydrogen on the second catalyst takes place to best effect, it is required to supplement the oxygen also present in the exhaust gases, suitably by a secondary air addition. Such a secondary air addition is desirably immediately before the second catalyst, suitably by a connection into the exhaust pipework not more than about 10 cm before the three-way catalyst. The secondary air is suitably provided by a pump, which may be electrically powered. The pump is desirably activated on start-up of the engine and may usefully be controlled by the electronic engine control unit. According to the individual engine design, the characteristics of the exhaust gas, and other contributing factors including the three-way catalyst composition, the secondary air may be operated for a limited period upon start-up of the engine, or may be operated continuously at the same or a lower air addition after light-off of the HC oxidation process. In a further embodiment, the secondary air addition may be additionally activated in an intermittent manner upon detection or approximation of an operating condition that requires supplementary air, for example in the event of high sulphur levels causing poisoning of the three-way catalyst.

Suitably HC traps are generally available in the art, and suitably comprise a deposit of a zeolite carried on a through-flow honeycomb catalyst support, which may be separate from or integral with the support used for the three-way catalyst. Desirably, the HC trap is mounted immediately before the three-way catalyst, especially within the same metal "box" or "can".

The three-way catalyst is desirably another platinum group metal catalyst, desirably comprising one or more of Pd, Rh and Pt, more desirably Pt or Pt/Rh. The catalyst is preferably supported on a wash-coated metal or ceramic through-flow honeycomb of conventional construction, suitably having 15.5 to 93 or more cells/sq cm (100 to 600 or higher cells/sq in.). Suitable loadings of PGM catalyst are 1.77 to 14.12 g/liter (50 to 400 g/ft$^3$) catalyst volume.

The three-way catalyst is conveniently a conventional catalyst; these have been found by extensive usage to be technically robust and resistant to degradation. This is in some contrast to catalysts developed to have light-off temperatures below ambient as required by the above-mentioned WO 96/39,576, which often show sensitivity to sulphur. Conventional three-way catalysts are also relatively inexpensive.

It is desirable that the engine management (ECU=engine control unit) is programmed to maximise the potential for hydrogen generation during the start-up period. This may be achieved not only by control of air/fuel ratio, $\lambda$, but also in some engines by valve and/or ignition timing. Initial tests have shown that the CO content of the exhaust gases upon start-up can be increased to almost 10% by volume. Our studies indicate that a hydrogen content of approximately 5 to 7% by vol should meet at least our initial targets on reaching light-off temperatures, but higher hydrogen contents, e.g. up to 20% by vol, would offer advantages under at least some conditions.

The present invention is illustrated by reference to the accompanying drawings, in which FIG. 1 is a schematic diagram of a motor vehicle incorporating a catalyst system according to the invention.

A gasoline engine, 1, has an exhaust system, 2, comprising exhaust manifold, 3, and exhaust pipe, 4. (Conventional silencer box or boxes are not shown.) A first catalyst, 5, is mounted close to the connection of the manifold to the pipe, 4. The pipe 4 is connected to an underfloor catalytic convertor box, 6, and a secondary air entry, 7, is located immediately upstream of the convertor box 6. The secondary air is provided by a pump, 8, controlled by the engine control unit, 9. Within the box 6 is a hydrocarbon trap, 10, mounted immediately upstream of a three-way catalyst, 11. The box is connected to the vehicle tailpipe, 12.

When the engine is cranked to initiate starting, the air pump 8 is activated. The exhaust gases, which are initially rich in HC and CO, contact the first catalyst 5 and CO and $H_2O$ are converted to $H_2$ and $CO_2$, thus enriching the exhaust gases with hydrogen. The enriched gases then pass to the catalytic convertor box after being dosed with secondary air, typically to create lean conditions equivalent to $\lambda=1.1$. Hydrocarbons are trapped in trap 10 as soon as the exhaust gases contact it, and are not desorbed until the trap is heated to an appropriate temperature. CO and $H_2$ are oxidised on the three-way catalyst, and the exotherm generated is sufficient to raise the temperature of the catalyst to in excess of 150° C. within a few seconds. At this point, the hydrocarbons begin to desorb and can be immediately oxidised over the catalyst, since the presence of hydrogen has reduced the light-off temperature for hydrocarbons. Such speed of response is not believed to be available through competing technologies including electrically heated catalysts, whether active or passive, except possibly some system incorporating a pre-heating device; such devices require considerable power and connection to external electrical power sources with considerable additional system equipment costs.

The invention is illustrated further by reference to a number of tests. Two types of experimental data are presented below. The first is derived from a synthetic catalyst test (SCAT) rig, which tests small catalyst cores using gas mixtures generated from bottled gas supplies. The second source is an engine test bed, fitted with a 4-cylinder, 1.8 liter gasoline engine of current design technology.

Test 1 illustrates SCAT rig data for the generation of hydrogen by three different catalyst samples, one of which is a commercial standard starter catalyst composition (1) having 100 g/cuft total Pd+Rh in a 14:1 wt ratio, carried on alumina/ceria with base metal promoters, the second (2) has 300 g/cuft Pd carried on the same alumina/ceria support, and catalyst (3) has 300 g/cuft Rh carried on ceria but with alumina as a binder. The considerable increase in the quantity of hydrogen generated can easily be seen. It should be noted that the test actually measured $CO_2$ which is easier to measure than $H_2$ but is prepared in identical volumes according to the equation $CO+H_2O \rightarrow CO_2+H_2$. The synthetic gas mixture comprises 7% carbon monoxide, 8% water vapor and 85% nitrogen, which is used to represent engine-like rich start emissions (but with no hydrocarbon and nitrogen oxides components). The results are shown in the attached drawing "Test 1".

Test 2 illustrates actual engine results, where the engine is operated at 3,000 rpm and the exhaust flow rate is ramped from 50 to 73 kg/hour. Here the decay in post-catalyst carbon monoxide and the increase in hydrogen gas concentrations demonstrate the performance of the starter catalyst (3) selected after Test 1 in a practical application. Starter catalyst (3) is a close-coupled catalyst ("CCC").

Test 3 illustrates SCAT rig results where the hydrogen/carbon dioxide ratio is manipulated to illustrate different degrees of water gas shift catalyst performance. Here it is shown that a high hydrogen content enhances the light-off of a conventional three-way catalyst.

Test 4 illustrates a typical light-off temperature of a conventional three-way catalyst, as mounted on the test bed engine discussed previously. Here no upstream starter catalyst is fitted. Light-off of the TWC occurs at 155° C.

Test 5 illustrates temperature plots at the inlet and the outlet of the TWC. Both the starter and the three-way catalyst are fitted. Here the hydrogen generated by the upstream starter catalyst significantly lowers the light-off temperature of the three-way catalyst, to 135° C.

Test 6 (Example of the invention) illustrates results from the complete system, where the hydrogen generating starter catalyst, hydrocarbon trap and three-way catalyst are fitted. Here further improvements in the light-off temperature of the three-way catalyst are illustrated This is believed to occur because the hydrocarbons adsorbed by the trap would normally suppress the three-way catalyst light-off. The light-off temperature is further reduced to 115° C.

The skilled person can readily modify the invention as described to obtain the benefits conceived, without departing from the scope of the present invention.

What is claimed is:

1. A system for the after-treatment of the exhaust gases from a gasoline-fuelled internal combustion engine designed to operate under essentially stoichiometric conditions, comprising a first catalyst disposed downstream of said engine, through which the exhaust gases flow and which is effective to catalyse a shift reaction between CO and $H_2O$ or is effective to catalyse the conversion of a reactant to generate a hydrogen enriched exhaust gas; a source of gaseous oxygen; a trap for hydrocarbons; and a three-way catalyst effective to catalystically oxidise HC and CO and to reduce $NO_x$.

2. A system according to claim 1, wherein said first catalyst comprises at least one of Pt and Rh.

3. A system according to claim 1 comprising an engine control unit effective to initiate, terminate or limit the quantity of gaseous oxygen supplied.

4. A system according to claim 3, wherein said first catalyst comprises at least one of Pt and Rh.

5. A system according to claim 1, comprising an engine control unit programmed to generate above-average amounts of CO in the exhaust gases during a start-up portion of the engine operating cycle.

6. A system according to claim 5, wherein the engine control unit is effective to initiate, terminate or limit the gaseous oxygen supplied.

7. A system according to claim 5, wherein said first catalyst comprises at least one of Pt and Rh.

8. A method of reducing pollutants from a gasoline-fuelled internal combustion engine, during start-up, wherein the engine is designed to operate after start-up under essentially stoichiometric conditions, which method comprises starting the engine under rich conditions, enriching the resulting exhaust gases with hydrogen by a catalytic water gas shift reaction to produce a hydrogen enriched gas, diluting the resulting exhaust gases with gaseous oxygen to produce lean conditions, trapping hydrocarbons in a hydrocarbon trap, and initiating oxidation of the hydrogen and CO over a three-way catalyst.

9. A method of reducing pollutants from a gasoline-fuelled internal combustion engine wherein the engine is designed to operate after start-up under essentially stoichiometric conditions, which method comprises starting the engine under rich conditions, enriching the resulting exhaust gases with hydrogen by a catalytic Water gas shift reaction to produce a hydrogen enriched gas, diluting the resulting exhaust gases with gaseous oxygen to produce lean conditions, trapping hydrocarbons in a hydrocarbon trap, and initiating oxidation of the hydrogen and CO over a three-way catalyst.

10. A methodlaccording to claim 9, wherein during the start-up portion of the engine operating cycle, the quantity of hydrogen in the hydrogen enriched gas is at least 5% by volume.

11. A method according to claim 10, wherein the quantity of hydrogen is from 5 to 7% by volume.

* * * * *

UNITED STATES PATENT AND TRADEMARK OFFICE
CERTIFICATE OF CORRECTION

PATENT NO. : 6,651,424 B1 Page 1 of 1
DATED : November 25, 2003
INVENTOR(S) : Martyn Vincent Twigg It is certified that error appears in the above-identified patent and that said Letters Patent is hereby corrected as shown below:

<u>Title page,</u>
Item [57], ABSTRACT,
Line 6, after "which is," insert -- effective to catalyse the conversion of a reactant to generate a hydrogen enriched --.

<u>Column 6,</u>
Line 40, delete "Water" and insert therefor -- water --.
Line 46, delete "methodlaccording" and insert therefor -- method according --.

Signed and Sealed this

Thirteenth Day of April, 2004

JON W. DUDAS
*Acting Director of the United States Patent and Trademark Office*